Figure 1:
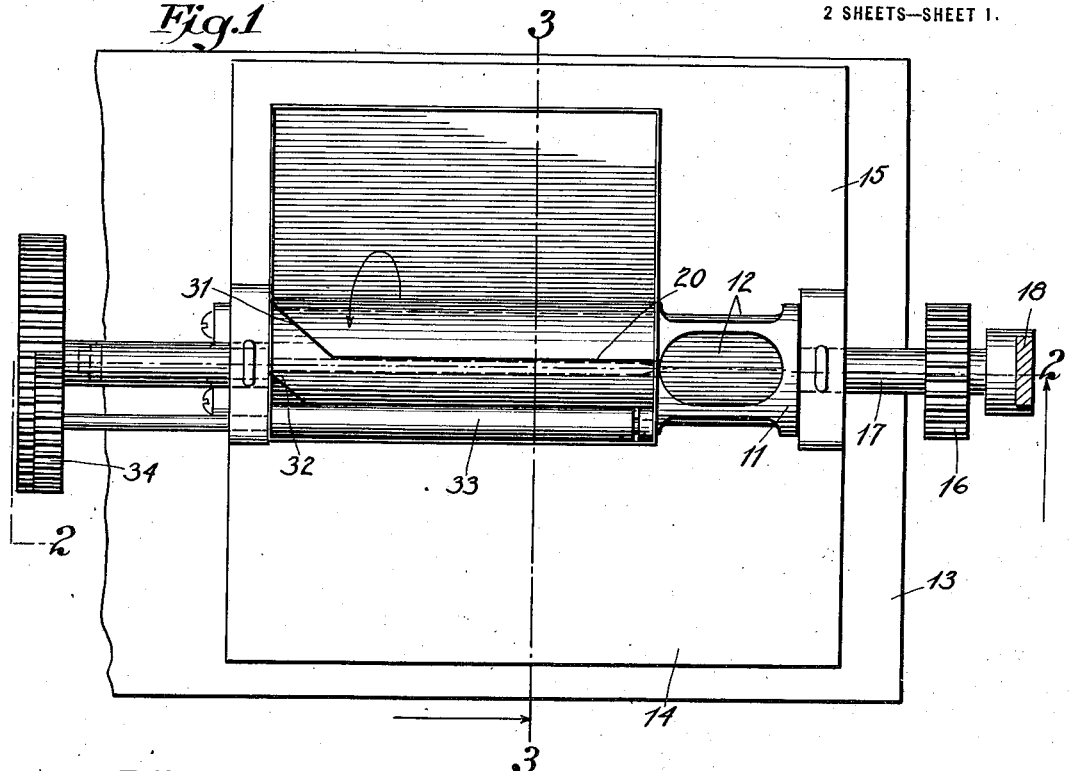

H. W. ERNY.
LOLLYPOP MACHINE.
APPLICATION FILED JULY 24, 1914.

1,179,168.

Patented Apr. 11, 1916.
2 SHEETS—SHEET 1.

WITNESSES

INVENTOR
Henry W. Erny
BY
ATTORNEYS

H. W. ERNY.
LOLLYPOP MACHINE.
APPLICATION FILED JULY 24, 1914.

1,179,168.

Patented Apr. 11, 1916.
2 SHEETS—SHEET 2.

WITNESSES

INVENTOR
Henry W. Erny
BY
ATTORNEYS

UNITED STATES PATENT OFFICE.

HENRY WILLIAM ERNY, OF NEW YORK, N. Y.

LOLLYPOP-MACHINE.

1,179,168.   Specification of Letters Patent.   Patented Apr. 11, 1916.

Application filed July 24, 1914. Serial No. 852,837.

*To all whom it may concern:*

Be it known that I, HENRY W. ERNY, a citizen of the United States, and a resident of the city of New York, borough of Brooklyn, in the county of Kings and State of New York, have invented a new and Improved Lollypop-Machine, of which the following is a full, clear, and exact description.

This invention relates to confectionery machines and has particular reference to machines for molding or making small piece candy.

Among the objects of the invention, more definitely stated, is to provide a machine for manufacturing lolly-pops, the machine comprising means for molding the lumps rapidly from a mass of material, and at the same time each lump is being formed a stick is forced into it, the operation continuing rapidly at a constant uniform speed and producing a uniform product.

The foregoing and other objects of the invention will hereinafter be more fully described and claimed and illustrated in the drawings forming a part of this specification in which like characters of reference indicate corresponding parts in all the views, and in which—

Figure 2:
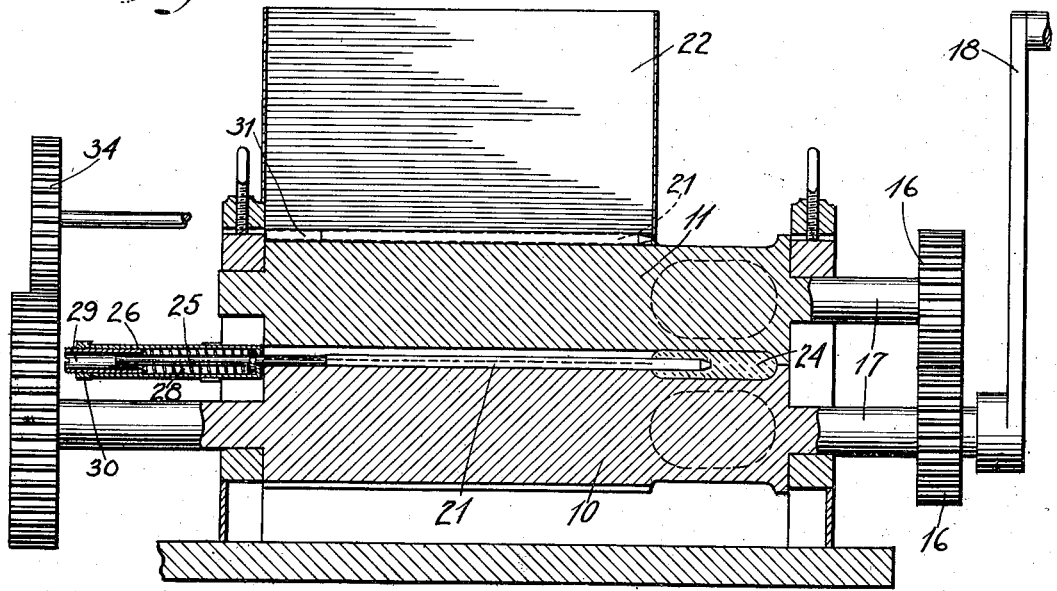
Figure 3:
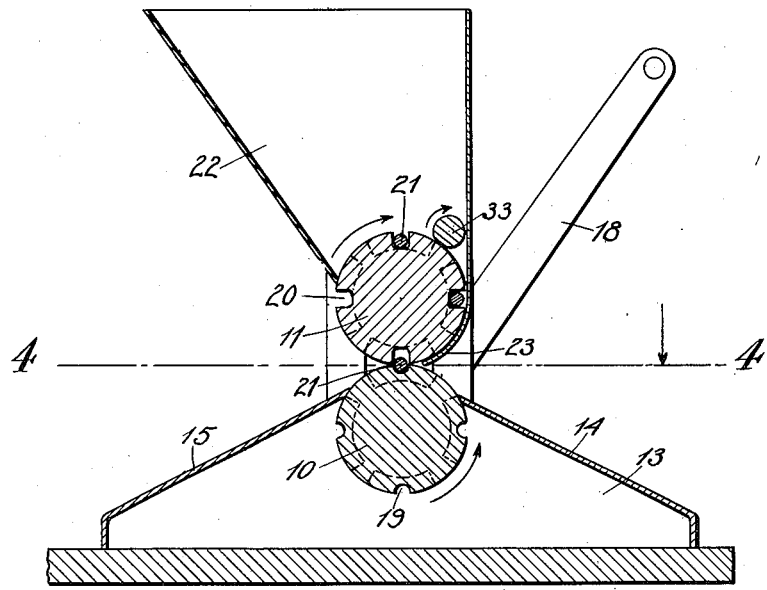
Figure 4:
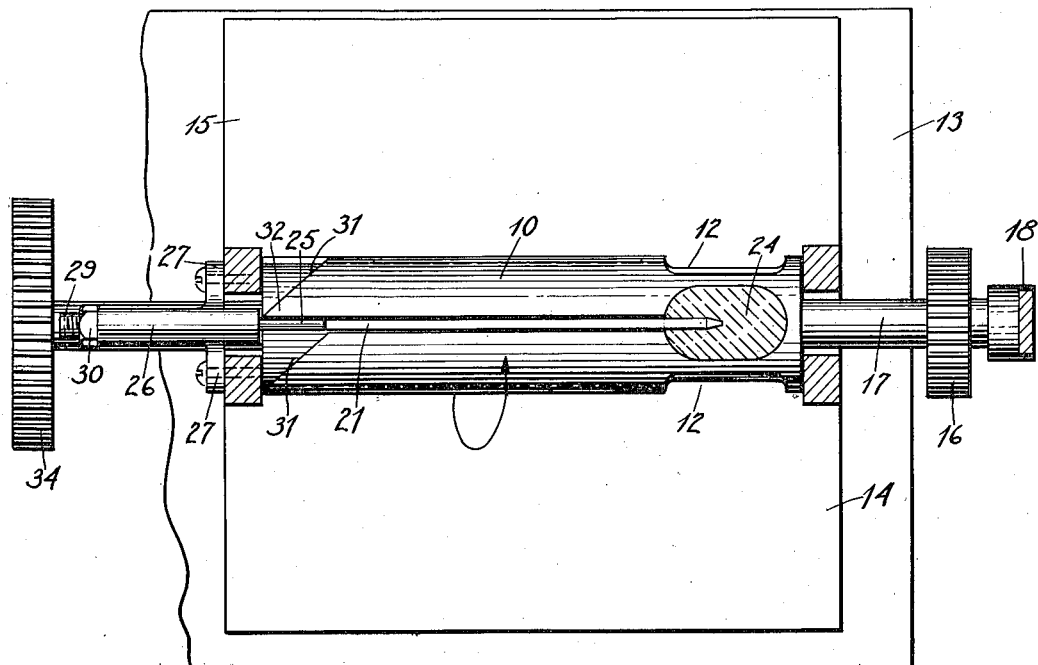

Figure 1 is a plan view of a preferred embodiment of the invention; Fig. 2 is a vertical longitudinal section of the same on the line 2—2; Fig. 3 is a vertical transverse section on the line 3—3 of Fig. 1; and Fig. 4 is a plan view of the bottom portion of the machine, parts being in section on the line 4—4 of Fig. 3.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings, I show a pair of rollers 10 and 11 having suitably arranged companion cavities 12 of any suitable size or form for producing the lumps or drops from the mass of material. These rollers are journaled in bearings, as usual, in any suitable form of base 13, and upon the base are supported front and rear platforms 14 and 15 over which the mass of material and product pass in any usual or approved manner. A pair of gears 16 are connected to the roller spindles 17 whereby the rollers are caused to operate in perfect unison or alinement by means of power applied to one of them as, for instance, through a crank 18 connected to the lower roller.

As shown herein, the cavities 12 are arranged at one end of the rollers and the remaining portions of the rollers are grooved longitudinally as shown at 19 and 20, the grooves 19 being formed in the lower roller and of substantially semi-circular form in cross section. The grooves 20 of the upper roller I prefer, however, to make deeper so as to receive singly the sticks 21 from a hopper 22 arranged above the same and in communication therewith, as shown best in Fig. 3. The hopper includes a lip 23 which projects downwardly well around the front face of the roller 11 so as to prevent the sticks from falling from the grooves 20 until the grooves 19 are reached. When a pair of grooves 19 and 20 come into juxtaposition, the stick carried down by the groove 20 will fall naturally into the groove 19. At this moment the lump 24 being formed by the cavities 12 of the several rollers will be substantially midway between the rollers and in position for the stick to be driven or forced into it by any suitable means. As shown in Fig. 2, the hopper holds the sticks in position vertically at one side of the line of movement of the lumps 24. The head of each stick lies substantially flush with the remote end of the roller 10 when in position to be driven into the lump.

The numeral 25 indicates a plunger reciprocating in a tubular casing 26 secured by means of ears 27 or other suitable fastening devices to the main frame of the machine opposite the ends of the rollers, and in such position as to cause the plunger 25 to lie and operate substantially in axial alinement with the center of the grooves 19 when such grooves come into coöperation with the upper grooves 20. The plunger is shown as acted upon by a spring 28 which tends to force it outwardly from the casing 26 and between the rollers, the plunger being guided at its inner end in a hole in the inner end of the casing 26 and at its outer end in a sleeve 29 adjustable in the outer end of the casing and adapted to be held in definite position by a lock nut 30 whereby the tension of the spring may be definitely determined.

That portion of each roller at the end of each groove remote from the cavity 12 is beveled off rearwardly as shown at 31. The two rollers thus provide a pair of beveled or cam-like shoulders which, acting against the point or inner end of the plunger, force the plunger outwardly after it has served to drive a stick into position in a lump, storing force in the spring 28 and when the point of the plunger rides over the points 32 at the ends of said shoulders, the plunger will snap quickly inwardly against the next stick, driving it into position, as shown in Figs. 2 and 4. The action of the plunger, hence, is automatic and is quick and reliable, enabling me to form the lumps 34 perfectly and with the sticks driven into the same in a uniform manner.

The sticks may be carried in the hopper 22 in any desired number and by means of a small roller 33 within the bottom of the hopper adjacent the upper roller, and geared as shown at 34 to the lower main roller 10, the sticks are kept in proper position and fed downwardly past the lip 23 quickly.

Having thus described my invention, I claim as new and desire to secure by Letters Patent:—

1. In a confectionery machine, the combination with a pair of rollers having companion cavities for forming individual lumps of candy in rapid succession, said rollers also being formed with companion grooves arranged longitudinally thereof, of means to rotate the rollers continuously at uniform speed, means to deliver sticks single into said companion grooves, a plunger to automatically force each stick longitudinally along the grooves into a lump of candy while in motion and being formed between the rollers, and cam means at one end of the rollers to set the plunger for its automatic action.

2. In a confectionery machine, the combination with a pair of companion rollers having coöperating pairs of cavities for forming in rapid succession lumps of candy and also having pairs of companion grooves arranged longitudinally thereof opposite the ends of the respective cavities, of means to deliver sticks singly into the grooves aforesaid, means to drive said rollers continuously at uniform speed, a plunger acting automatically upon the several sticks to force them longitudinally along the grooves so as to drive each stick into the end of a lump of candy while the latter is in motion and being formed, and means including a plurality of cam shoulders formed on one of the rollers to set the plunger repeatedly preparatory to successive automatic action upon the several sticks.

3. In a confectionery machine, the combination of a pair of rollers, means to connect the rollers for simultaneous movement with the same surface speed, said rollers being formed with companion cavities for forming lumps of candy, the rollers also having pairs of companion grooves arranged longitudinally thereof and communicating with the cavities, the grooves of one roller being deeper than the others, means to deliver sticks individually to the roller having the deeper grooves, means to hold the sticks in the grooves to which they are delivered in succession until the companion grooves are brought into action, and means acting automatically against the head end of the sticks to force them longitudinally of the grooves and into the candy lumps while the latter are being formed.

4. In a confectionery machine, the combination of a pair of rollers coöperating with each other and having pairs of cavities for forming in rapid succession lumps of candy and also having pairs of companion grooves extending longitudinally of the rollers toward said cavities, means to operate the rollers in unison at the same surface speed, each roller at the end remote from the lump cavities being formed with a beveled shoulder extending rearwardly from each groove and toward the end of the roller, means to deliver sticks in succession to the several pairs of grooves, and means acting upon the sticks to automatically force the same singly into the several lumps of candy while they are being formed, said stick forcing means including a plunger acted upon in one direction by said shoulders.

5. In a confectionery machine, the combination of a pair of rollers having coöperating lump forming cavities and also having coöperating pairs of longitudinal grooves leading toward said cavities, portions of the rollers being beveled rearwardly from the grooves and toward the extreme ends thereof remote from the lump cavities, means to deliver sticks in succession into the pairs of grooves, a plunger located between the rollers and adapted to force each stick longitudinally of the grooves between which it is lying and into a lump of candy being formed, a casing constituting a guide for the plunger, and a spring acting upon the plunger to make it operative, said plunger being forced outwardly against the tension of the spring by coöperation with said beveled shoulders.

In testimony whereof I have signed my name to this specification in the presence of two subscribing witnesses.

HENRY WILLIAM ERNY.

Witnesses:
BEN LEHR,
D. T. WINCKLER.